United States Patent [19]
Taub et al.

[11] Patent Number: 6,151,229
[45] Date of Patent: Nov. 21, 2000

[54] CHARGE PUMP WITH GATED PUMPED OUTPUT DIODE AT INTERMEDIATE STAGE

[75] Inventors: Mase J. Taub, Elk Grove; Xin Liu, Sacramento, both of Calif.

[73] Assignee: Intel Corporation, Santa Clara, Calif.

[21] Appl. No.: 09/346,483

[22] Filed: Jun. 30, 1999

[51] Int. Cl.[7] .............................. H02M 3/18; G05F 1/10
[52] U.S. Cl. .............................................. 363/60; 327/536
[58] Field of Search ........................ 363/59, 60; 327/530, 327/535, 536

[56] References Cited

U.S. PATENT DOCUMENTS

| | | |
|---|---|---|
| 5,301,097 | 4/1994 | McDaniel . |
| 5,414,669 | 5/1995 | Tedrow et al. . |
| 5,422,586 | 6/1995 | Tedrow et al. . |
| 5,426,391 | 6/1995 | Tedrow et al. . |
| 5,430,402 | 7/1995 | Tedrow et al. . |
| 5,446,408 | 8/1995 | Tedrow et al. . |
| 5,483,486 | 1/1996 | Javanifard et al. . |
| 5,650,671 | 7/1997 | Pascucci et al. ........................... 363/60 |
| 5,841,703 | 11/1998 | Wojciechowski . |
| 5,973,546 | 10/1999 | Le et al. ................................... 327/536 |
| 5,982,224 | 11/1999 | Chung et al. ............................ 327/536 |

*Primary Examiner*—Matthew Nguyen
*Attorney, Agent, or Firm*—Blakely, Sokoloff, Taylor & Zafman LLP

[57] ABSTRACT

A reconfigurable charge pump is disclosed. A gated pumped output diode is coupled between the outputs of an intermediate pump stage and a final pump stage of the reconfigurable charge pump. When a control signal is in a first state, the gated pumped output diode is placed in a non-conducting state to prevent back conduction of current from the output of the final pump stage to the intermediate pump stage. When the control signal is in a second state, the gated pumped output diode is placed in a transparent state to conduct current from the output of the intermediate pump stage to an output of the reconfigurable charge pump.

21 Claims, 6 Drawing Sheets

CHARGE PUMP WITH GATED PUMPED OUTPUT DIODE AT INTERMEDIATE STAGE

FIELD OF THE INVENTION

The present invention relates to the field of power delivery, and more particularly to a charge pump that can be dynamically reconfigured to have different numbers of pump stages.

BACKGROUND OF THE INVENTION

Charge pumps are multi-stage analog circuits for generating special-purpose voltages from relatively low voltage supplies in integrated circuits (ICs) and other devices. For example, EEPROM devices (electrically erasible, programmable read-only-memory) such as flash EEPROM and other non-volatile memories typically require voltages for program, read and erase operations that are higher than the device supply voltage (Vcc).

Charge pumps operate by pumping the input voltage at each stage to an incrementally higher voltage and clamping the higher voltage to prevent discharge back to the previous stage. The total number of stages in a charge pump is determined by the initial supply voltage, the voltage increment ("the step") in each stage and the desired output voltage. The output current that can be delivered by the charge pump is a function of the charge transferred from each pumping stage to the next, which in turn is a function of the size of a pumping capacitor in each stage. The voltage and current output from the charge pump for a given purpose define a load point for the charge pump.

Some devices include a charge pump that can be dynamically reconfigured for different operating modes to satisfy multiple load points. For example, in a flash EEPROM device, a charge pump is typically reconfigured into two different modes in order to program a flash cell: a slew mode in which the charge pump supplies a relatively high voltage at relatively low current, and a program mode in which the charge pump supplies a lower voltage and a higher current. Circuits for implementing reconfigurable charge pumps are disclosed in U.S. Pat. No. 5,430,402 of Tedrow et al. and U.S. Pat. No. 5,483,486 of Javanifard et al., both assigned to Intel Corporation.

FIG. 1 is a diagram of a prior art charge pump that can be reconfigured into slew and program modes. When a mode control signal 17 is deasserted, the charge pump is placed in a program mode. In program mode, Vcc is coupled to respective input stages of two five-stage charge pumps, pump A and pump B. The five stages in pump A (12A–12E) are clocked by clocks CLK1, CLK2, CLK3 and CLK4 to develop an output voltage of approximately six times Vcc which is transferred to the pump output 20 via a transistor 15 connected to form a diode. The result is a pump output voltage from pump A approximately equal to 6 Vcc–$V_t$, $V_t$ being a threshold voltage drop across the diode required to place the diode 15 in a conducting state.

The five stages of pump B (12F–12J) are also clocked by clocks CLK1, CLK2, CLK3 and CLK4 to develop an output voltage of 6 Vcc, but in pump B, the output of the final stage 12J is coupled to the pump output 20 via a pumped output diode 14. A pumped output diode is a circuit for transferring an input voltage to an output terminal in response to a clock signal. The pumped output diode 14 is placed in a transparent state (i.e., no voltage drop across the pumped output diode from input to output) by a capacitively coupled pulse from clock CLK1 and therefore avoids the $V_t$ drop caused by the diode 15 at the output of pump A. Consequently, even though the total circuit area occupied by pump B (i.e., the footprint of pump B) is approximately the same as that of pump A, pump B develops a higher output voltage and therefore delivers a higher current to the load (Z) than pump A. A circuit for implementing a pumped output diode that can be coupled to the final stage of a charge pump is disclosed in U.S. Pat. No. 5,841,703 to Wojciechowski, assigned to Intel Corporation.

When the mode control signal 17 is asserted, the charge pump is placed in slew mode. In slew mode, the pump B input is decoupled from Vcc (i.e., by operation of inverter 18 and transistor 19) and coupled instead to the output of the final stage 12E of pump A, forming a combined 10-stage charge pump. The voltage developed at the final stage 12J of the combined charge pump is approximately 11 Vcc and is coupled transparently to the pump output 20 through the pumped output diode 14.

The purpose of the diode 15 at the output of pump A is to prevent back conduction from the charge pump output into the final stage 12E of pump A. Without the diode 15, the voltage differential between the charge pump output 20 and the final stage 12E of pump A would cause current to flow back into the final stage 12E, substantially reducing the amount of current that can be delivered to the load 21 in slew mode.

Thus, it can be seen that in the prior art reconfigurable charge pump of FIG. 1, inequality between the pump A and pump B output voltages (and currents) is tolerated in order to support concatenation of the pumps into a single, combined charge pump. Pump B delivers more power to the load than pump A, even though the two pumps occupy approximately the same circuit area.

SUMMARY OF THE INVENTION

A reconfigurable charge pump and method for operating the reconfigurable charge pump are disclosed. The reconfigurable charge pump includes a plurality of pump stages including an intermediate pump stage and a final pump stage. A pumped output diode is coupled between an output of the intermediate pump stage and an output of the final pump stage.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

A reconfigurable charge pump capable of delivering higher output current than a prior art reconfigurable charge pump having approximately the same footprint is disclosed.

Figure 2:
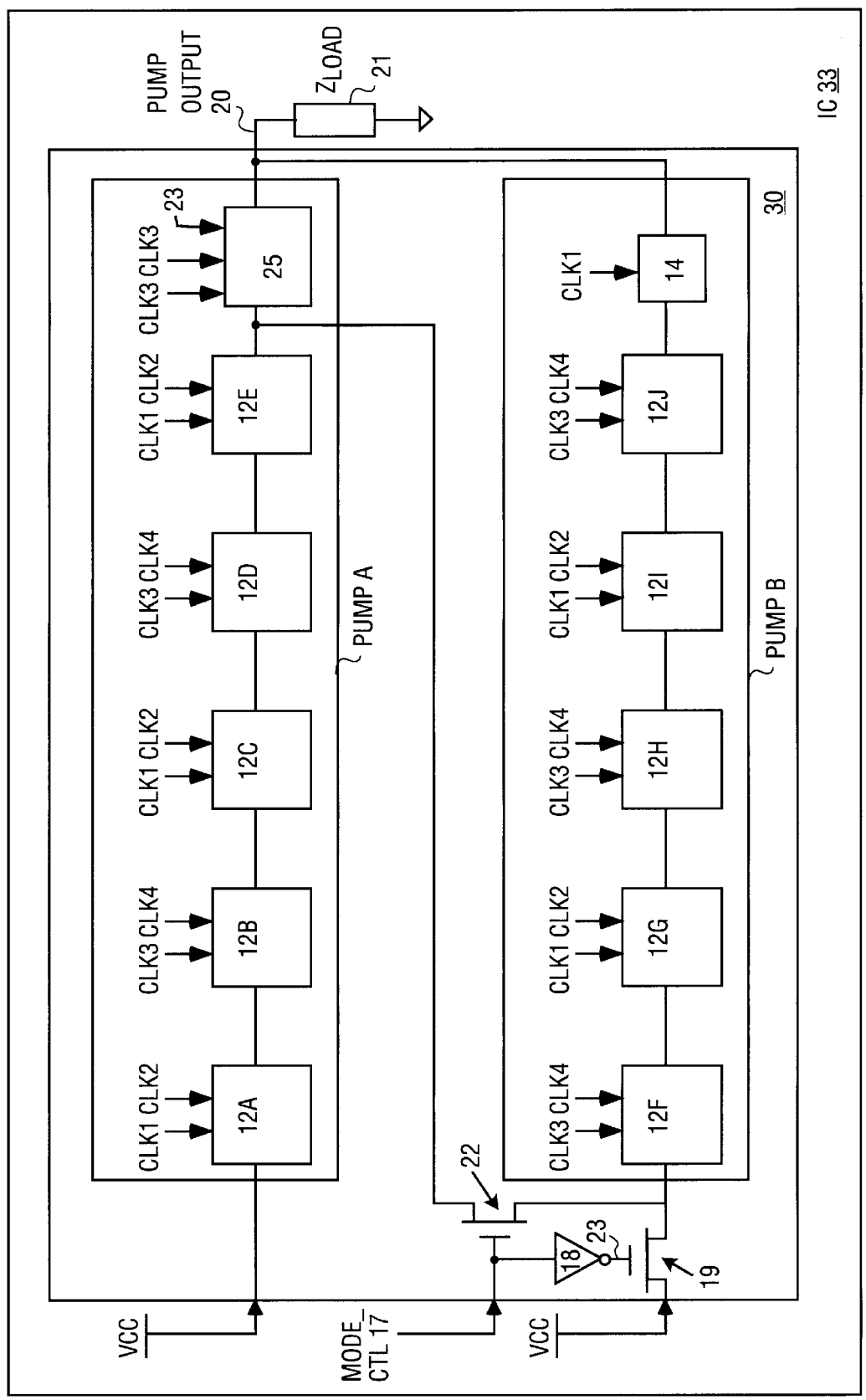
FIG. 2 is a diagram of a reconfigurable charge pump 30 according to one embodiment.

FIG. 2 is a diagram of an integrated circuit 33 (IC) that includes a reconfigurable charge pump 30 according to one embodiment. The IC may be any device that requires development of voltages higher than a supply voltage (Vcc) of the IC including without limitation flash EEPROM and other types of electrically erasable and programmable memory. The charge pump 30 includes two pump circuits, pump A and pump B, that can be dynamically reconfigured for operation in either a program mode or a slew mode according to the state of a mode control signal 17. When the mode control signal 17 is deasserted, the charge pump 30 is configured for operation in the program mode. More specifically, a stage coupling transistor 22 used to couple the output of the final stage 12E of pump A to an input of the initial stage 12F of pump B is opened (i.e., placed in a non-conducting state). Also, the deasserted mode control signal 17 is inverted by an inverter 18 to produce a dual pump signal 23. When asserted, the dual pump signal 23 causes a transistor switch 19 to close, coupling Vcc to the input stage 12F of pump B. The dual pump signal 23 is also used to enable the operation of a gated pumped output diode 25 coupled to the final stage 12E of pump A.

Figure 1:
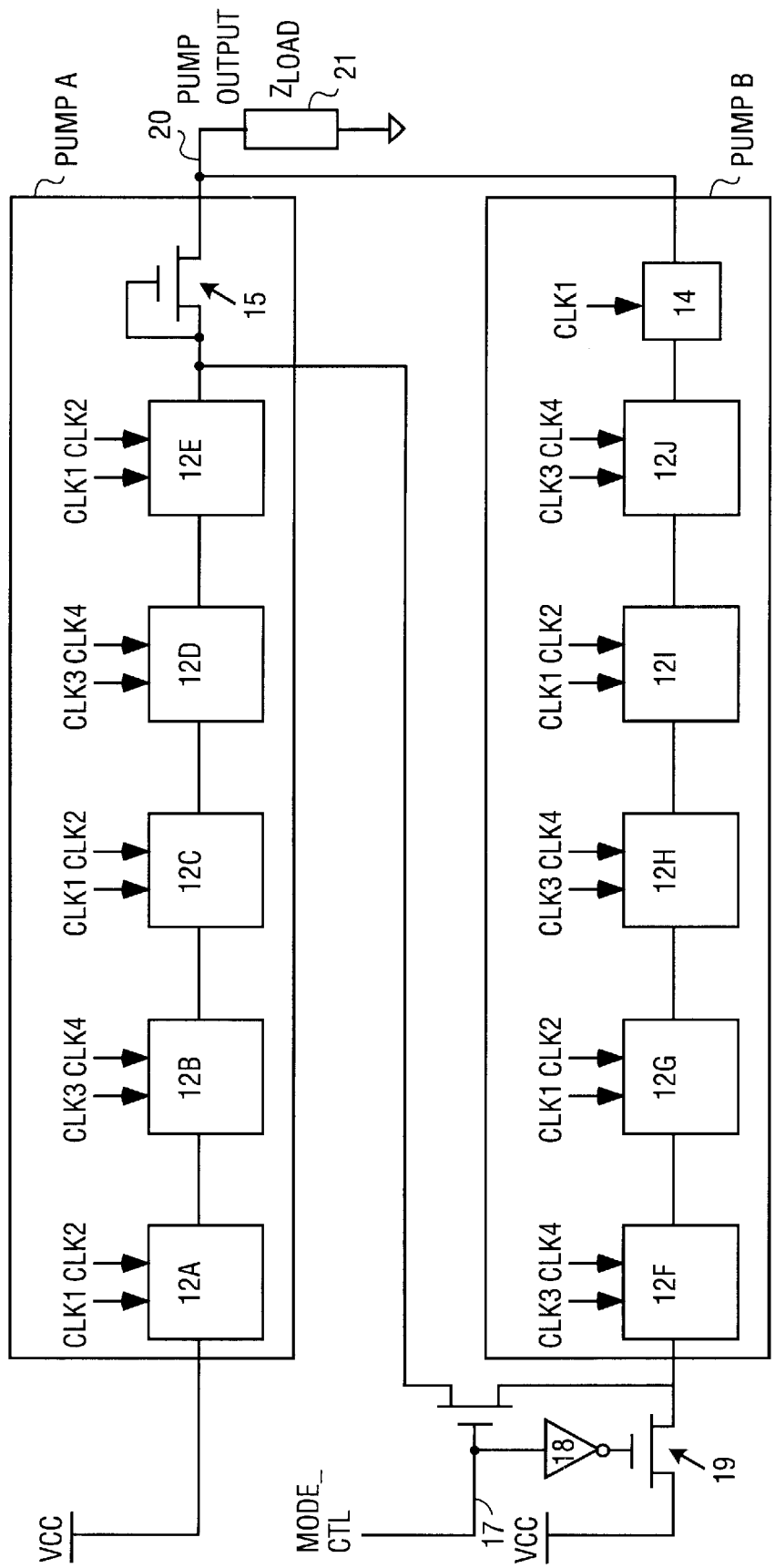
FIG. 1 is a diagram of a prior art charge pump that can be reconfigured into slew and program modes.

In program mode, pumps A and B develop program voltages in parallel to deliver a lower voltage, but higher current to a load 21 (e.g., a cell or set of cells in a flash EEPROM) than when pumps A and B are coupled in series. In contrast to the prior art circuit of FIG. 1, however, the presence of the gated pumped output diode 25 at the output of pump A permits transparent coupling of the final stage 12E of pump A to the pump output 20. That is, the diode drop associated with the pump A output in the prior art design of FIG. 1 is avoided. Because a higher output voltage is developed by pump A, the charge pump 30 is able to deliver a higher current to the load 21 than the prior art design of FIG. 1 for the same circuit footprint. Conversely, the charge pump 30 is able to deliver the same current to the load 21 as the prior art design of FIG. 1, but with a smaller circuit footprint. Because charge pumps tend to consume considerable die area in integrated circuits such as flash EEPROMs, the ability to source the same load current using a smaller footprint is a significant advantage.

When the mode control signal 17 is asserted, the charge pump 30 is placed in a slew mode. More specifically, assertion of the mode control signal 17 causes the stage coupling transistor 22 to close (preferably in a transparent state), coupling the output of the final stage 12E of pump A to the input of the initial stage 12F of pump B. Thus, the stages 12A–12J of pumps A and B are concatenated into a single chain of pump stages capable of developing a higher output voltage than either pump A or pump B alone. When the mode control signal 17 is asserted, the dual pump signal 23 is deasserted, decoupling the pump B input from Vcc and disabling operation of the gated pumped output diode 25 in pump A. As discussed below, the gated pumped output diode 25 is designed so that circuit nodes within the pumped output diode 25 used to bias the pumped output diode 25 for conduction are isolated from both the pump output 20 and the output of the final stage 12E of pump A. In at least one embodiment, these circuit nodes are also initialized to pre-determined voltage levels to eliminate current flow back through the pumped output diode 25. By this design, back conduction through the gated pumped output diode 25 is avoided so that the output of the final stage 12E of pump A is isolated from the slew mode voltage at the pump output 20.

Figure 3:
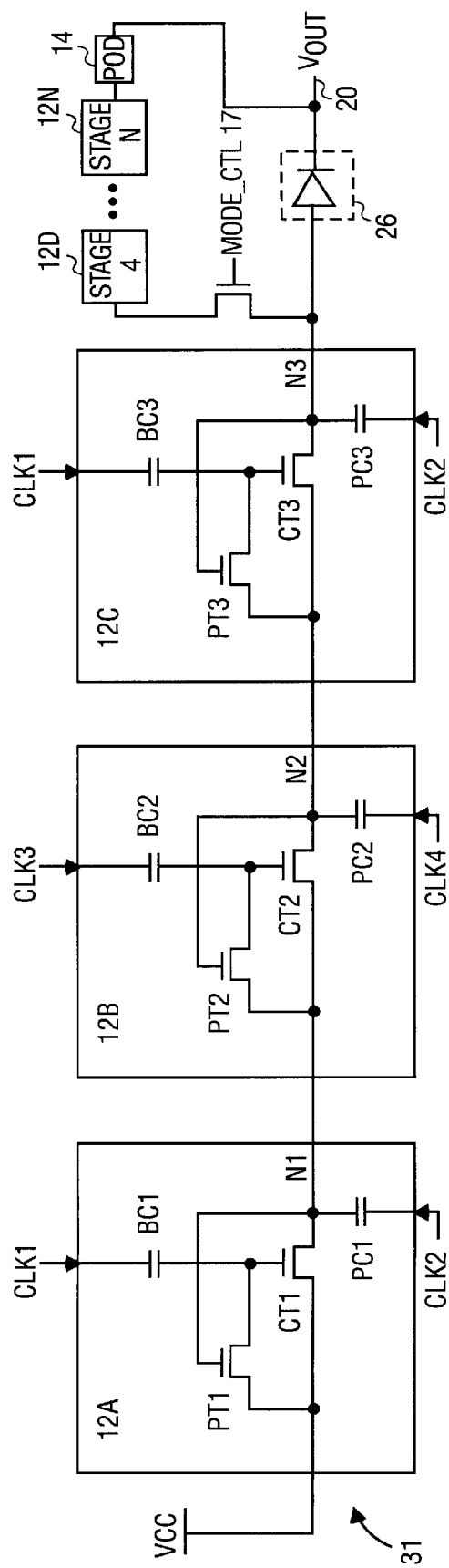
FIG. 3 is a diagram of a three stage charge pump.
Figure 4:
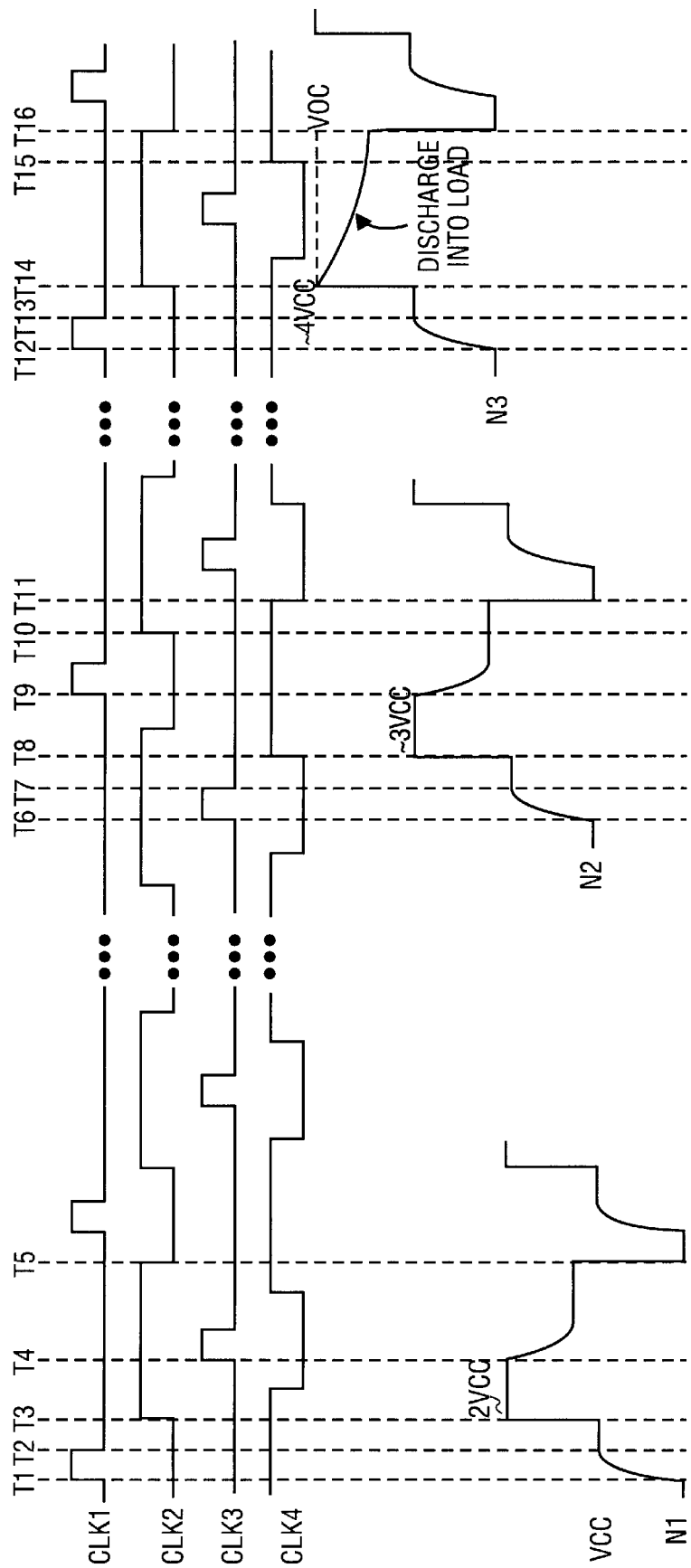
FIG. 4 is a timing diagram illustrating the operation of the charge pump of FIG. 3.

FIG. 3 is a diagram of a three stage charge pump 31. Each pump stage (12A, 12B, 12C) includes a coupling transistor (CT1, CT2, CT3), a precharge transistor (PT1, PT2, PT3), a pump capacitor (PC1, PC2, PC3) and a boot capacitor (BC1, BC2, BC3). Stages 1 and 3 of the charge pump 31 receive clock signals CLK1 and CLK2, while stage 2 receives clock signals CLK3 and CLK4. The waveforms for these clocking signals are illustrated in FIG. 4. For the purpose of explanation, the amplitudes of the clock signals CLK1, CLK2, CLK3 and CLK4 are assumed to be Vcc. Other clock signal amplitudes may be used in alternate embodiments. Also, each of the coupling and precharge transistors is preferably a low-threshold, N-type field-effect transistor known as an S-type device, but other types of transistors may be used in alternate embodiments. As with other field effect transistors, an S-type device enters the transparent state when its gate-to-source voltage exceeds $V_t+V_{body\ effect}$.

Referring to the timing diagram of FIG. 4 and to pump stage 12A in the charge pump 31 of FIG. 3, the gate voltage of coupling transistor CT1 is initially at a voltage between ground and Vcc and CT1 is off. At time T1, CLK1 goes high, causing the gate voltage of CT1 to become greater than the voltage at node N1 ($V_{N1}$) by more than the threshold voltage ($V_t$) of CT1, placing CT1 in a transparent state. Consequently, CT1 begins conducting current, causing $V_{N1}$ to rise toward Vcc. At time T2, CLK1 goes low, turning CT1 off and clamping $V_{N1}$ at a potential near Vcc. At time T3, CLK2 goes high, stepping $V_{N1}$ by the amplitude of the CLK2 signal so that $V_{N1}$ approaches 2 Vcc. Precharge transistor PT1 is turned on by the assertion of CLK2 at time T3, causing the potential at the gate of CT1 to precharge through PT1 to a voltage between ground and Vcc. Thus, the gate of CT1 is precharged so that CT1 will reenter the transparent state at the next rising edge of CLK1. At time T4, CLK3 goes high, causing the coupling transistor CT2 in the next stage to enter the transparent state. As a result, current begins to flow from node N1 to node N2 through CT2, causing $V_{N1}$ to drop. At time T5, CLK2 goes low, causing the voltage at node N1 to return to its initial low condition. The first pump stage 12A continues to cycle in this fashion.

Referring to the second pump stage 12B of the charge pump 31, just prior to time T6, the gate voltage of coupling transistor CT2 is at a potential between Vcc and 2 Vcc and CT2 is off. At time T6, CLK3 goes high, stepping the gate voltage of CT2 above the voltage at node N2 ($V_{N2}$) by more than $V_t$. Thus, CT2 is placed in a transparent state and begins conducting current from node N1 to node N2 so that $V_{N2}$ rises toward 2 Vcc. At time T7, CLK3 goes low, turning CT2 off and clamping $V_{N2}$ at a potential near 2 Vcc. At time T8, CLK4 goes high, stepping $V_{N2}$ up to approximately 3 Vcc. The assertion of CLK4 also turns on precharge transistor PT2, causing the gate of CT2 to be precharged to the potential of $V_{N1}$ during the overlapping on-time of clock signals CLK2 and CLK4 between times T10 and T11. Thus, the gate of CT2 is precharged to a voltage between Vcc and 2 Vcc so that CT2 will reenter the transparent state at the next rising edge of CLK3. At time T9, CLK1 goes high, turning on the coupling transistor CT3 in the next stage. Consequently, current begins to flow through CT3, causing $V_{N2}$ to drop. At time T11, CLK4 goes low, causing $V_{N2}$ to return to its initial state. The second pump stage 12B continues to cycle in this fashion.

Referring to the third pump stage 12C of the charge pump 31, just prior to time T12, the gate voltage of coupling transistor CT2 is at a potential between 2 Vcc and 3 Vcc and CT3 is off. At time T12, CLK1 goes high, stepping the gate voltage of CT3 above the voltage at node N3 ($V_{N3}$) by more than $V_t$. Thus, CT3 is placed in a transparent state and begins conducting current from node N2 to node N3 so that $V_{N3}$ rises toward 3 Vcc. At time T13, CLK1 goes low, turning CT3 off and clamping $V_{N3}$ at a potential near 3 Vcc. At time T14, CLK2 goes high, stepping $V_{N3}$ up to approximately 4 Vcc. The assertion of CLK2 also turns on precharge transistor PT3, causing the gate of CT3 to be precharged to the potential of $V_{N2}$ during the overlapping on-time of clock signals CLK2 and CLK4 between times T15 and T16. Thus, the gate of CT3 is precharged to a voltage between 2 Vcc and 3 Vcc so that CT3 will reenter the transparent state at the next rising edge of CLK3. In an open circuit state, the output voltage of the charge pump (Voc) is substantially equal to $V_{N3}$, discharging somewhat over time due to leakage and parasitic capacitance. When coupled to a load, current flows through output diode 26 to the load, causing the potential at node N3 to be discharged as shown. At time T16, CLK2 goes low, causing $V_{N3}$ to return to its initial state.

From the foregoing, it can be seen that the charge pump 31 operates by clamping the pumped up voltage output by a given stage in a succeeding stage and then further stepping the clamped voltage through a pumping capacitor. The effect of this operation is to clamp a progressively higher voltage at the output of each stage. Additional stages may be added and clocked alternately by CLK1/CLK2 and CLK3/CLK4, as illustrated in FIG. 2. Because each stage steps the voltage at its input by approximately Vcc, the open circuit output voltage developed by the charge pump 31 is approximately (N+1)Vcc, where N is the number of charge pump stages. Of course, this voltage is unregulated, so that the loading of the charge pump will have a significant effect on the actual voltage output by each stage. The voltage output at each stage is also affected by the transistor body effect, parasitic capacitance and other small-signal phenomena.

Still referring to FIG. 3, consider what happens when a mode control signal is asserted to reconfigure the charge pump 31 to include additional stages 4–N (12D–12N) and a pumped output diode 14. The charge pump output 20 (Vout) will now be substantially higher than $V_{N3}$ so that it becomes necessary to isolate node N3 from the charge pump output 20 to prevent back-conduction of current through stage 3 12C. This problem may be generalized as the need to isolate an intermediate output tap of the charge pump from another tap of the charge pump at which a higher voltage has been developed. As discussed above in reference to FIG. 1, at least one prior art solution to this problem is to place a diode (or transistor configured in diode mode) between node N3 and the charge pump output 20, resulting in an undesirable $V_t$ drop in the output voltage of the charge pump when the intermediate tap is used. While pumped output diodes have been used to avoid the $V_t$ drop in the final stage of a charge pump, placing a pumped output diode at an intermediate stage is problematic because when the pumped output diode enters a conducting state, the difference in potential between the final output stage of the charge pump and the output of the intermediate stage may result in back conduction through the pumped output diode, substantially reducing the amount of current that can be delivered to the load.

Figure 5:
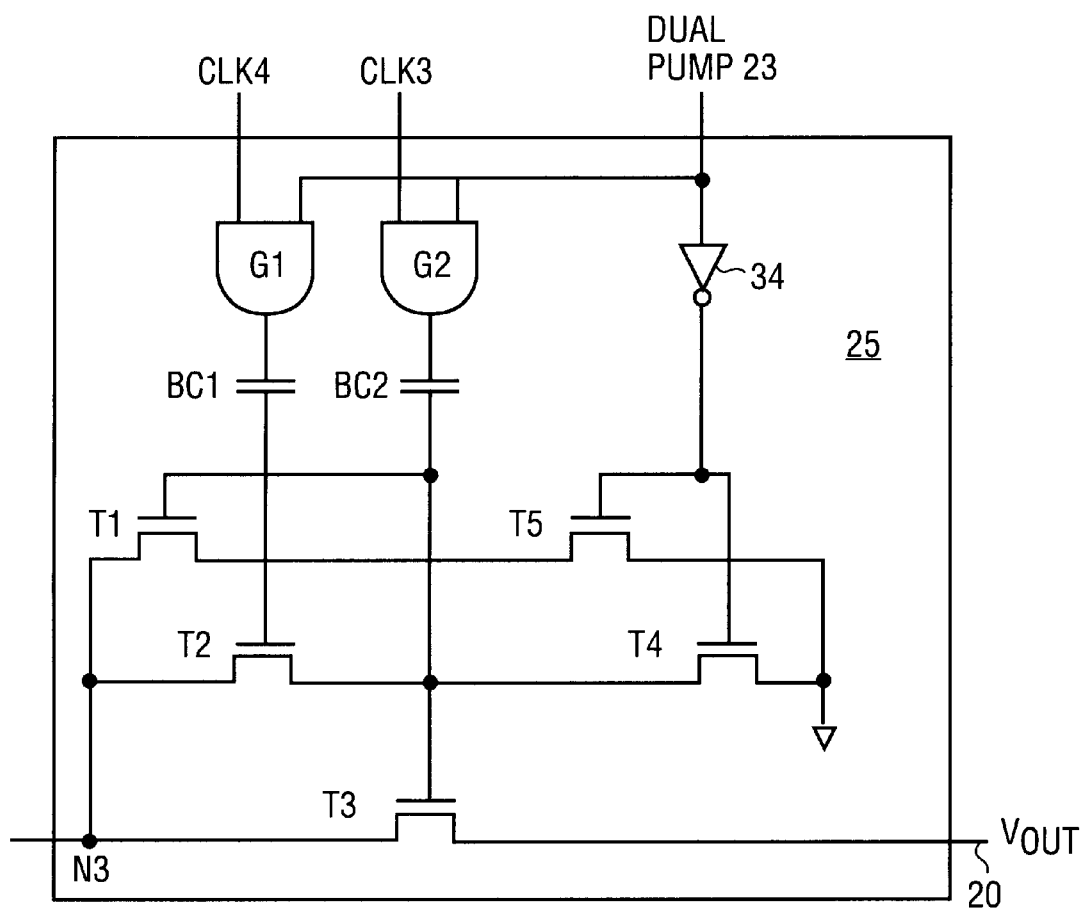
FIG. 5 is a circuit diagram of a gated pumped output diode according to an embodiment that can be used at an intermediate stage of a reconfigurable charge pump.

FIG. 5 is a circuit diagram of a gated pumped output diode 25 according to an embodiment that can be used at an intermediate stage of a reconfigurable charge pump. For the purpose of illustration, the gated pumped output diode 25 is assumed to be used in place of the output diode 26 in the charge pump 31 of FIG. 3. When the dual pump signal 23 is asserted, logic gates G1 and G2 are both enabled, passing clock signals CLK3 and CLK4 to boot capacitors BC1 and BC2 respectively. Also, inverter 34 drives the gate voltage of transistors T4 and T5 low so that T4 and T5 are turned off. Referring to the timing diagram of FIG. 4, just prior to time T6, the voltage on the gate of T3 is at a potential slightly below the voltage at node N3 (i.e., $V_{N3}$). Consequently, when CLK3 goes high at time T6, transistor T3 is placed in a transparent state, causing $V_{N3}$ to be transferred to the charge pump output with negligible attenuation. The CLK3 signal is also applied to the gate of transistor T1, turning T1 on and causing the gate of transistor T2 to precharge to a potential approaching $V_{N3}$. Because the gate voltage of transistor T2 is less than or equal to $V_{N3}$ and less than the potential at the gate of transistor, transistor T2 is turned off.

At time T7, CLK3 goes low, turning off T3 and clamping the charge pump output 20 at $V_{N3}$. At time T8, CLK4 goes high, turning on transistor T2 so that the gate of T3 is coupled to node N3. Consequently, during the overlapping on time of clocks CL2 and CLK4 between times T10 and T11, the gate of T3 is precharged to $V_{N3}$ in preparation for the next assertion of CLK3. When CLK4 goes low at time T11, T2 is turned off, isolating the charge at gate T3. When CLK3 is next asserted, T3 is again placed in the transparent state to transfer $V_{N3}$ to the charge pump output 20.

When the charge pump 31 is reconfigured to include higher order stages 4–N, Vout becomes substantially higher than $V_{N3}$, so that drain and source designations of T3 are effectively reversed. That is, the terminal of T3 coupled to the charge pump output becomes the drain and the terminal coupled to node N3 becomes the source. Thus, to avoid back conduction through transistor T3, it is necessary to prevent the gate potential of transistor T3 from exceeding $V_{N3}$. According to one embodiment, back conduction is prevented by disabling logic gates G1 and G2 in response to deassertion of the dual pump signal 23. In this way, the CLK3 and CLK4 signals are effectively suppressed so that transistors T1, T2 and T3 are not turned on. Also, because inadvertent charging of the gate of T3 or trapped charge on the gate of T3 may result in sub-threshold leakage current flowing back through T3, the output of inverter 34 is used to turn on transistors T4 and T5, grounding the gates of transistors T1, T2 and T3.

So long as the dual pump signal 23 remains deasserted, boot capacitors BC1 and BC2 are not charged and T3 remains in the non-conducting, low-leakage state. Initializing the gates of transistors T1, T2 and T3 to the ground potential ensures that no trapped charge remains on the gate of T3. Consequently, the charge pump output remains isolated from node N3 so that leakage current flowing back through the pumped output diode is negligible when stages 4–N are coupled into the pump path. On the other hand, when stages 4–N are removed from the pump path (i.e., by deassertion of mode control 17), the dual pump signal 23 is reasserted so that the pumped output diode couples node N3 to the charge pump output 20 without the $V_t$ drop associated with the prior art technique shown in FIG. 1.

Figure 6:
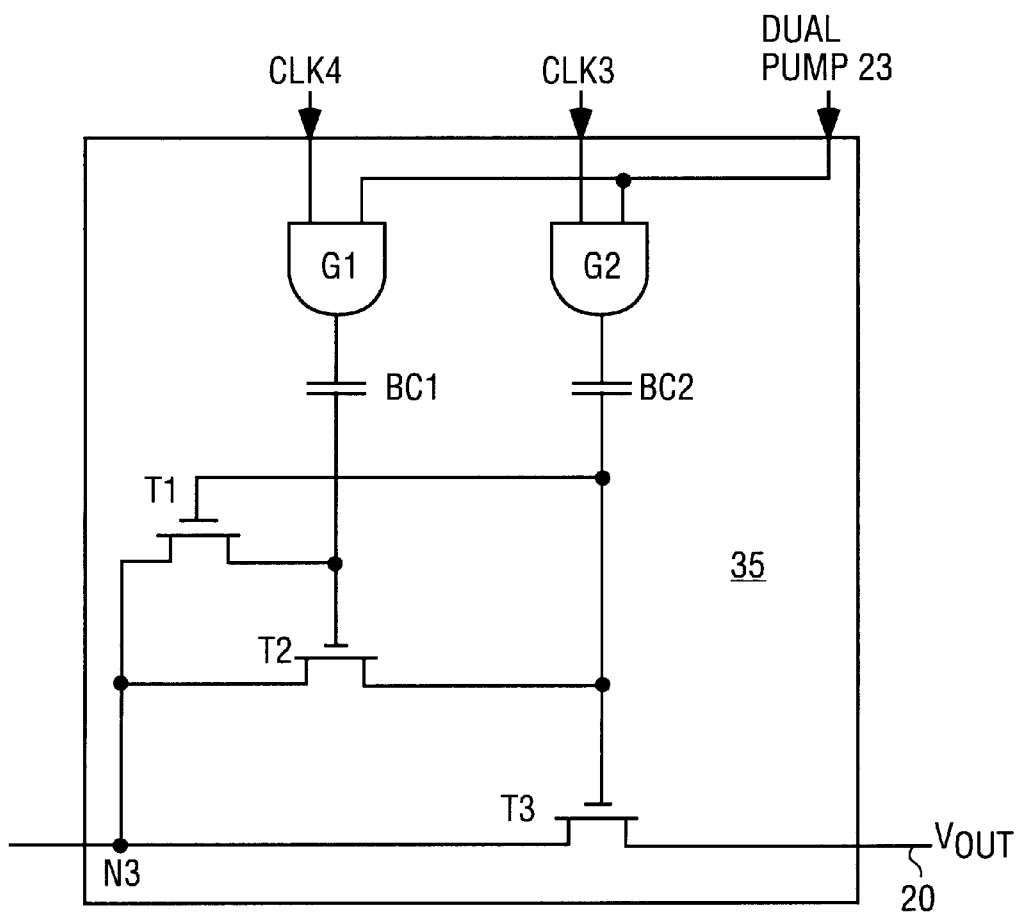
FIG. 6 is a circuit diagram of a pumped output diode 25 that can be used at the intermediate stage of a charge pump according to an alternate embodiment.

FIG. 6 is a circuit diagram of a pumped output diode 35 that can be used at the intermediate stage of a charge pump according to an alternate embodiment. Except for the removal of inverter 34 and transistors T4 and T5, the pumped output diode operates as described above in reference to FIG. 5. To avoid trapping charge on the gate of transistor T3 (which might result in leakage), however, the deassertion of the dual pump signal 23 is timed to occur after CLK3 has been deasserted, preferably before CLK 4 is asserted to recharge the gate of T3 to $V_{N3}$. By timing deassertion of the dual pump signal 23 in this way, the gate potential at T3 is left at a potential less than $V_{N3}$ and less than Vout. Consequently, the pumped output diode exhibits negligible back conduction current when the dual pump signal 23 is deasserted and operates to pass $V_{N3}$ to Vout with negligible attenuation when the dual pump signal 23 is asserted. In an alternative embodiment, the dual pump signal 23 may be asserted at any time that the T3 gate voltage is less than $V_{N3}$.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A reconfigurable charge pump comprising:
   a plurality of pump stages including an intermediate pump stage and a final pump stage, the intermediate pump stage and the final pump stage having respective outputs; and
   a sated pumped output diode coupled between the output of the intermediate pump stage and the output of the final pump stage, wherein the gated pumped output diode is transparent to the output of the charge pump.

2. The reconfigurable charge pump of claim 1 wherein the gated pumped output diode includes circuitry to prevent current from being conducted through the pumped output diode when the output of the intermediate pump stage is used to supply an input voltage to another pump stage of the plurality of pump stages.

3. The reconfigurable charge pump of claim 1 wherein the gated pumped output diode includes circuitry to set the voltage of a biasing node of the gated pumped output diode to an initial state to prevent back conduction of current through the gated pumped output diode.

4. The reconfigurable charge pump of claim 1 wherein the gated pumped output diode includes:
   a first circuit to block application of a clock signal to a biasing terminal of a coupling transistor coupled between an input and output of the gated pumped output diode;
   a second circuit to couple the biasing node to a reference potential to prevent leakage current from flowing through the coupling transistor.

5. A method of operating a charge pump comprising:
   developing a first output voltage in a first plurality of pump stages of the charge pump;
   coupling the first output voltage to an output of the charge pump through a first gated pumped output diode, wherein the first gated pumped output diode is transparent to the output of the charge pump;
   reconfiguring the charge pump to develop a second output voltage in response to a control signal by coupling at least one additional pump stage and a second pumped output diode between the first plurality of pump stages and the output of the charge pump; and
   disabling a first clock signal used to clock the first gated pumped output diode in response to the control signal to prevent back conduction of current through the first gated pumped output diode.

6. The method of claim 5 wherein developing a first output voltage in a first plurality of pump stages of the charge pump comprises coupling a first pump stage of the plurality of pump stages to a source voltage in response to a pump enable signal.

7. The method of claim 6 wherein coupling the first output voltage to an output of the charge pump through a first gated pumped output diode comprises coupling the first output voltage to the output of the charge pump through a first transistor included in the first gated pumped output diode by applying a bias voltage greater than the first output voltage to the first transistor to place the first transistor in a conducting state.

8. The method of claim 7 wherein applying the bias voltage to the first transistor comprises applying the bias voltage to a gate of the first transistor.

9. The method of claim 7 wherein applying a bias voltage greater than the first output voltage to the first transistor comprises generating the first output voltage by capacitively coupling a pulse of the first clock signal to a bias terminal of the first transistor.

10. The method of claim 7 wherein applying a bias voltage greater than the first output voltage to the transistor comprises coupling the first output voltage to a bias terminal of the first transistor and capacitively coupling a pulse of the first clock signal to the bias terminal of the first transistor, the pulse and the first output voltage combining to produce the bias voltage greater than the first output voltage.

11. The method of claim 10 wherein coupling the first output voltage to a bias terminal of the first transistor comprises coupling the first output voltage to the bias terminal of the first transistor through a second transistor, the second transistor by applying a bias voltage greater than the first output voltage to the second transistor, the bias voltage greater than the first output voltage being generated, in part, by a pulse from a second clock signal.

12. The method of claim 11 further comprising disabling the second clock signal in response to the control signal to prevent applying the bias voltage greater than the first output voltage to the second transistor.

13. The method of claim 5 wherein coupling at least one additional pump stage and a second pumped output diode between the first plurality of pump stages and the output of the charge pump comprises coupling an output of a final pump stage of the first plurality of pump stages to an input of the at least one additional pump stage in response to the control signal.

14. The method of claim 3 wherein coupling the output of the final pump stage to the input of the at least one additional pump stage comprises placing a stage coupling transistor into a conducting state in response to the control signal, the stage coupling transistor being coupled in series with the output of the final pump stage and the input of the at least one additional pump stage.

15. The method of claim 5 wherein reconfiguring the charge pump to develop a second output voltage comprises increasing the first output voltage in the at least one additional pump stage.

16. A reconfigurable charge pump comprising:
   a first plurality of pump stages to develop a first output voltage;
   a first gated pumped output diode to couple the first output voltage from the first plurality of pump stages to an output of the charge pump, wherein the first gated pumped output diode is transparent to the output of the charge pump;
   at least one additional pump stage coupled to receive the first output voltage from the first plurality of pump stages via a stage coupling transistor, the at least one additional pump stage being configured to develop a second output voltage when the stage coupling transistor is in a conducting state;
   a second pumped output diode to couple the second output voltage from the at least one additional pump stage to the output of the charge pump; and a control signal path coupled to the stage coupling transistor and to the first gated pumped output diode, the control signal path being configured to deliver a control signal to place the stage coupling transistor in the conducting state and to disable the first gated pumped output diode from back conducting current to the first plurality of pump stages.

17. The reconfigurable charge pump of claim 16 wherein the reconfigurable charge pump is embodied in an integrated circuit device.

18. The reconfigurable charge pump of claim 17 wherein the integrated circuit device is an electrically erasable programmable read only memory (EEPROM).

19. The reconfigurable charge pump of claim 16 wherein the first gate pumped output diode includes:

an input terminal;

an output terminal;

a first coupling transistor coupled between the input terminal and the output terminal; and gating circuitry to receive the control signal and, in response thereto, to prevent the first coupling transistor from being placed in a conducting state.

20. A reconfigurable charge pump comprising:

first voltage developing means for developing a first output voltage;

a first coupling means for coupling the first output voltage from the first voltage developing means to an output means of the charge pump, wherein the first coupling means is transparent to the output of the charge pump;

second voltage developing means for receiving the first output voltage from the first voltage developing means via a switching means, the second voltage developing means being configured to develop a second output voltage when the switching means is in a conducting state;

a second coupling means for coupling the second output voltage from the second voltage developing means to the output means of the charge pump; and a control means for delivering a control signal to place the switching means in the conducting state and to disable the first coupling means from back conducting current to the first voltage developing means.

21. A reconfigurable charge pump comprising:

a clock signal generator to generate a plurality of clock signals;

a first plurality of pump stages coupled to one another and to the plurality of clock signals to generate a first output voltage;

a first pumped output diode coupled between a final pump stage of the first plurality of pump stages and an output of the charge pump, the first pumped output diode further being coupled to receive a first clock signal of the plurality of clock signals, the first pumped output diode being configured to couple a voltage output from the final pump stage to the output of the charge pump in response to a pulse of the first clock signal;

at least one additional pump stage coupled to the final pump stage via a switching transistor;

a second pumped output diode coupled between the at least one additional pump stage and the output of the charge pump; and a signal path coupled to deliver a control signal to the switching transistor and to the first pumped output diode, the control signal placing the switching transistor in a conducting state and disabling the first clock signal coupled to the first pumped output diode when in a first state.

\* \* \* \* \*

UNITED STATES PATENT AND TRADEMARK OFFICE
CERTIFICATE OF CORRECTION

PATENT NO. : 6,151,229
DATED : November 21, 2000
INVENTOR(S) : Taub et al.

It is certified that error appears in the above-identified patent and that said Letters Patent is hereby corrected as shown below:

Claim 1,
Line 6, delete "sated" and change to -- gated --

Signed and Sealed this

Twenty-sixth Day of March, 2002

Attest:

JAMES E. ROGAN
*Attesting Officer*  *Director of the United States Patent and Trademark Office*